United States Patent [19]

Pooley

[11] Patent Number: 4,779,345
[45] Date of Patent: Oct. 25, 1988

[54] COLLAPSIBLE BUCKSAW

[76] Inventor: William H. Pooley, Box 1324, Eagle River, Wis. 54521

[21] Appl. No.: 872,263
[22] Filed: Jun. 9, 1986
[51] Int. Cl.⁴ .................. B21D 39/00; B23P 11/00
[52] U.S. Cl. ........................................ 30/506; 30/512
[58] Field of Search ............... 30/507, 506, 512, 513, 30/510

[56] References Cited

U.S. PATENT DOCUMENTS 923,543  6/1909  Luzzatti ................................ 30/506
2,734,536  2/1956  Harper ................................. 30/506

Primary Examiner—Frederick R. Schmidt
Assistant Examiner—Maurina Rachuba
Attorney, Agent, or Firm—Henry C. Kovar

[57] ABSTRACT

A collapsible bucksaw has an elongate straight sawblade and a collapsible H-shape frame with a central compression frame, a pair of end frames pivotally mounted to ends of the blade, a looped cord for a tightener and a rod to tighten the cord, the coil is slipped over cathces on outer ends of the end frames and is twisted and wound up to become shorter and thereby tighten the blade taunt, when the blade is taunt the tightener tool is slipped into a stop notch in the frame and is locked in place.

4 Claims, 1 Drawing Sheet

COLLAPSIBLE BUCKSAW

BACKGROUND OF THE INVENTION

1. Field of the Invention

This invention pertains to a collapsible bucksaw, to a frame for a collapsible bucksaw, and to a method of setting up a collapsible bucksaw.

2. The Prior Art

The bucksaw with an H-shaped frame is a historic favorite for cutting wood.

Collapsible saws for camping, carrying in the field and for carrying in vehicles have not successfully utilized the H-shape frame.

The most popular collapsible saw features an extruded aluminum tube of abround cross-section into which fits a blade and a H-shaped aluminum beam for a second half of the frame. This saw sets up in a triangular configuration and is effective only in short strokes and does not protect its blade well because the teeth stick out of the U-shaped extrusion.

A second type of collapsible saw is shown in Dustrude U.S. Pat. No. 3,191,648. This saw also sets up in a triangle and is limited to short strokes because the frame arms hit the wood being sawed.

A third type of popular saw is the low-priced metal tube frame in an inverted U-shape. This saw is low priced and is only partially subject to a shortened stroke. However, this saw does not collapse, does not protect its blade, and is relatively dangerous.

None of the known prior art saws are collapsible and able to duplicate the effectiveness of the bucksaw, while offering protection for the blade and safety when in a storage position.

OBJECTS OF THE INVENTION

It is an object of the present invention to provide a new and improved collapsible bucksaw.

It is an object of the present invention to provide a new and improved frame for a collapsible bucksaw.

It is an object of the present invention to provide a new and improved method of setting up a collapsible bucksaw.

SUMMARY OF THE INVENTION

A collapsible bucksaw has an elongate sawblade, a rigid compression frame, a pair of relatively pivotable end frames, each end frame has a blade end and a tension end with an abutment for the compression frame between the blade and tension ends, a blade protector is in each end frame, tightening structure engageseach tension end and a tool shortens the tightening structure and is stopped upon the frame when the blade is taunt.

A collapsible H-shape frame for a bucksaw has a rigid compression frame, a pair of end frames for abutting against the compression frame to form the H-shape, foldable tightening structure, a tool for shortening the tightening structure, and a stop on the frame for locking the tool.

A method of setting up a collapsible bucksaw has the steps of unfolding a pair of end frames about ends of the sawblade, inserting a rigid compression frame between the end frames, unfolding a folded tightener and connecting the unfolded tightener to the end frames, manipulating the tightener with a tool and shortening it to taunt the blade, and locking the tool to the frame.

Many other advantages, features and additional objects of the present invention will become manifest to those versed in the art upon making reference to the detailed description and accompanying drawings in which the preferred embodiment incorporating the principles of the present invention is set forth and shown by way of illustrative example.

DESCRIPTION OF THE PREFERRED EMBODIMENT

Figure 1:
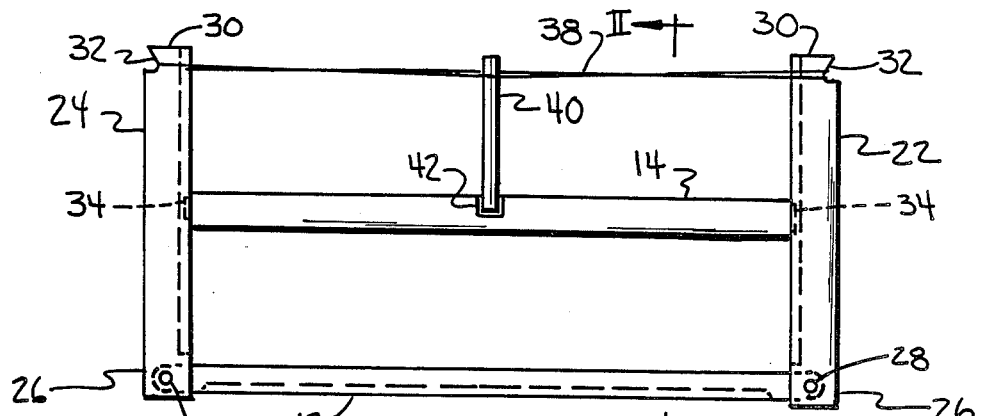
FIG. 1 is a side elevational view of the preferred embodiment of the collapsible bucksaw of the present invention, when in the working configuration.
Figure 2:
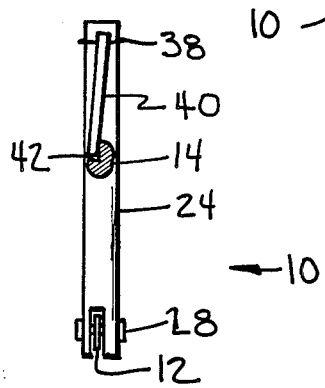
FIG. 2 is an end elevational view through line II—II of FIG. 1.
Figure 3:
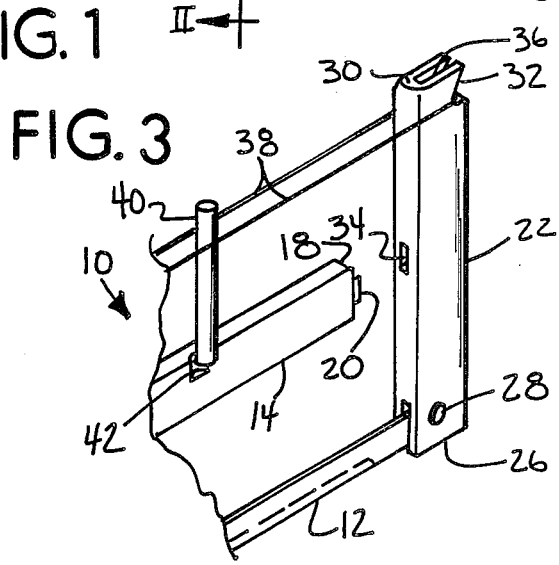
FIG. 3 is an exploded perspective view of one of the end frames of the bucksaw of FIG. 1.

According to the principles of the present invention, a collapsible bucksaw is shown in FIG. 1 and generally indicated by the numeral 10. The bucksaw 10 has an elongate straight sawblade 12 of a predetermined length and a collapsible frame generally indicated by the numeral 14.

The collapsible frame 14 has an elongate rigid central compression frame 16, with opposing ends 18 each having a tenon 20. A pair of relatively pivotable end frames 22, 24 each have a blade end 26 which is slotted completely through and through which a fastener 28 extends to pivotally fasten the end frame 22, 24 to an end of the blade 12. An opposed tension end 30 on each end frame 22, 24 has a catch 32. An abutment 34, which is preferably a mortise, is provided about mid-height in each end frame 22, 24 between the blade end 26 and the tension end 30. The cross-section of each end frame 22, 24, as best shown in FIG. 5, is a U-shape with an interior elongate blade slot 36 for receiving and protecting the sawblade 12. The blade slot 36 runs the entire length of the end frame 22, 24. The abutment 34 is opposed to the blade slot 36 and the catch 32 is in the open side of the blade slot 36. Each end 22, 24 pivots about 270 degrees around the fastener 28 from the working position and configuration shown in FIG. 1 which are generally perpendicular to the blade 12, into the storage positions and configuration shown in FIG. 4 where the blade 12 has been received, teeth first, in the protective blade slots 36. The combined lengths of the end frames 22, 24 is substantially the same as the length of the blade 36 so that when both end frames close up on the blade 36, all of the teeth of the blade 36 are substantially covered, enclosed and protected. The end frames 22, 24 are preferably of the same length and are identical.

Figure 4:
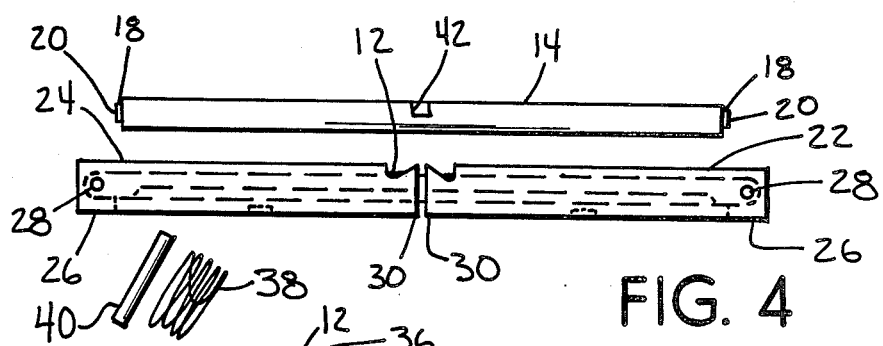
FIG. 4 is a side elevational view of the bucksaw of FIG. 1 in the collapsed storage configuration.
Figure 5:
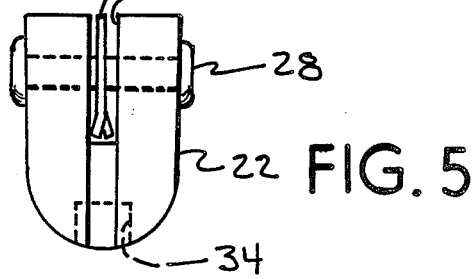
FIG. 5 is an end elevational view of the bucksaw as shown in FIG. 4.

The blade tightener 38 is preferably an endless cord of small diameter rope in a closed loop that is normally folded up as shown in FIG. 4. The tightener 38 has a length of about twice the length of the blade 36 and is looped over both of the catches 32 where upon it sits with a pair of parallel strands extending the length of the saw between the end frames 22, 24. A tightener tool is then inserted in between the side-by-side strands of the cord forming the tightener 38, and the tightener 38 is wound up and shortened by manually turning the tool 40. As the tightener 38 is wound up and shortened, the tension ends 30 are pulled inward about the compression frame 16 and the blade ends 26 are turned outwards to pull the blade 12 taunt. When the blade 12 is satisfactorily taunt, the tool 40 which is preferably a short rod having a length of less than half the length of an end frame 22, 24, is pushed through the tightener 38 and into a stop notch 42 which prevents further rotation of the tool 40 and locks the tool 40 with respect to the frame 14 keeping the tightener 38 and blade 12 both taunt.

To knock down the bucksaw 10, the tool 40 is merely pushed out of the stop notch 42 and the tightener 38 unwinds and the frame 14 comes apart and will collapse into the configuration of FIG. 4.

To set up the bucksaw 10, the end frames 22, 24 are turned back up to the positions and configurations shown in FIG. 1, the compression frame 16 is put in place, the tightener 38 is put on, and the tool 40 is used to tighten up the blade 12 as previously described.

The saw has several advantages. It completely knocks down, it completely protects the teeth of its blade, the saw user is protected from the teeth when the saw is in storage, the saw can cut either way and be pushed or pulled from either end, and the full length efficient stroke of the traditional bucksaw is provided enabling effective and relatively efficient sawing of large cross-sectional wood.

Although other advantages may be found and realized and various modifications may be suggested by those versed in the art, it should be understood that I wish to embody within the scope of the patent warranted hereon, all such embodiments as reasonably and properly come within the scope of my contribution to the art.

I claim as my invention:

1. A collapsible bucksaw comprising
a. an elongate straight sawblade of predetermined length;
b. a rigid compression frame having a predetermined length approximating the length of the blade;
c. a pair of generally identical and relative pivotable opposed end frames, the combined length of which is the same as the blade length, each end frame having
   1. a slotted through blade end about and pivotally connected to a respective end of the blade with a 270 degree hinge;
   2. a tension end having a catch;
   3. abutment means on a convex side of the frame and between the blade and tension ends for abutting acceptance of respective opposed ends of the compression frame;
   4. an elongate blade protection slot extending the full length of each end frame, each protection slot comprising a slotted U-shaped cross section along the end frame length into which a respective one-half of the blade fits teeth first withall blade teeth facing towards and into a bottom of the U-shaped protection slot while the saw is collapsed into a storage position, with
   5. each end frame being pivotable at least 270 degrees with respect to the blade from the storage position to an alternate working position which is at a generally right angle to the blade and the compression frame, each U-shaped cross section protection means facing open end outward and away from each other and away from the blade when the end frames are in the working position;
d. elongate tightening means engagable with both catches for pulling the tension ends together about the compression frame for pulling the blade taunt;
e. tool means engagable with the tightening means for effecting shortening of the tightening means; and
f. stop means for engaging and locking the tool means and the tightening means when the blade is satisfactorily taunt.

2. The saw of claim 1, in which the end frames are identical and cover all saw teeth on the full length of the blade when in the storage position, with the respective tension ends facing each other end to end and completely covering all teeth upon the blade.

3. A collapsible bucksaw having an H-shape frame, comprising
a. an elongate straight sawblade of predetermined length;
b. a rigid compressing frame having a predetermined length approximately the same as the blade;
c. a pair of relatively pivotable and discrete identical opposed end frames, each end frame having
   1. a slotted through blade end pivotally fastened to a respective end of the blade forming a 270 degree hinge;
   2. a tension end having a tightener catch,
   3. means between the blade and tension ends for engaging and compressively abutting the compression frame, and
   4. an elongate U-shaped cross-section into which a respective one-half of the blade folds teeth first only for storage with all teeth of the blade being completely enclosed;
d. a tightening cord having a length of about twice the length of the blade and means for being connected to both of the catches so that two strands of cord extend side-by-side between the catches.
e. a tool placable between the cord strands for winding up the strands and shortening the cord to pull the tension ends together about the compression frame and to tighten the blade;
f. means on one of said frames for locking the tool when the blade is satisfactorily taunt; and
g. in which the combined length of the end frames substantially encloses all of the blade when in storage with the tension ends facing each other end to end proximate the center of the length of the blade.

4. A method of using a collapsible bucksaw, comprising the steps of
a. unfolding a pair of opposed end frames, 270 degrees each, one about each end of an elongate straight saw blade, from a storage position overlapping and enclosing all blade teeth from the teeth side first and protecting all teeth of the blade to a usable position which is generally perpendicular to the blade and facing away from the exposed teeth;
b. inserting a rigid elongate compression frame in between the end frames at about the respective midlength of the end frames;
c. unfolding a previously folded-up tightening element and connecting the unfolded element on to a catch adjacent the distal end of each end frame;
d. manipulating the element tight with a tool;
e. locking the tool to one of the frames when the tightening element and the blade are both at a satisfactory tauntness, thereafter using the saw;
f. subsequently unlocking the tool, untightening and removing the element and removing the compression frame; and
g. folding each of the end frames 270 degrees over and around the ends of the blade and accepting one-half of the blade teeth first into what was an outward facing U-shaped blade protecting slot in the respective end frame, said folded end frames having their distal ends facing each other end to end upon the enclosed and protected blade with every tooth on the blade facing toward and against a respective bottom of the end frame protective slots, every tooth being completely enclosed within the slots.

* * * * *